C. J. WEST.
DIFFERENTIAL RACK.
APPLICATION FILED JUNE 19, 1920.

1,389,233.

Patented Aug. 30, 1921.
2 SHEETS—SHEET 2.

Inventor
Charles J. West
By Paul & Paul
HIS ATTORNEYS

UNITED STATES PATENT OFFICE.

CHARLES JOHAN WEST, OF HARLEM, MONTANA, ASSIGNOR TO REED EKEGREN & CO., OF HARLEM, MONTANA, A CORPORATION OF MONTANA.

DIFFERENTIAL RACK.

1,389,233.   Specification of Letters Patent.   Patented Aug. 30, 1921.

Application filed June 19, 1920. Serial No. 390,215.

*To all whom it may concern:*

Be it known that I, CHARLES J. WEST, a citizen of the Kingdom of Sweden, resident of Harlem, county of Blaine, State of Montana, have invented certain new and useful Improvements in Differential Racks, of which the following is a specification.

The object of my invention is to provide a rack for supporting an axle and differential housing and the transmission shaft and its housing to enable a workman to obtain access to the differential gears without the necessity of having the parts upon the floor of the shop or garage, where they may become separated or misplaced and where it is inconvenient and laborious to separate the transmission shaft from the differential housing or reassemble them.

A further object is to provide a rack which will enable the workman to have the axle and transmission shaft in the same relative position for convenience of reassembling or reconnecting when the work on the differential is completed.

A further object is to provide means collecting the oil or grease which may drip from the differential and a convenient receptacle for the tools necessary for working on or around the differential and transmission shaft.

A still further object is to provide a rack which, when not in use, can be easily and quickly folded to a compact condition.

In the accompanying drawings forming part of this specification,

Figure 1:
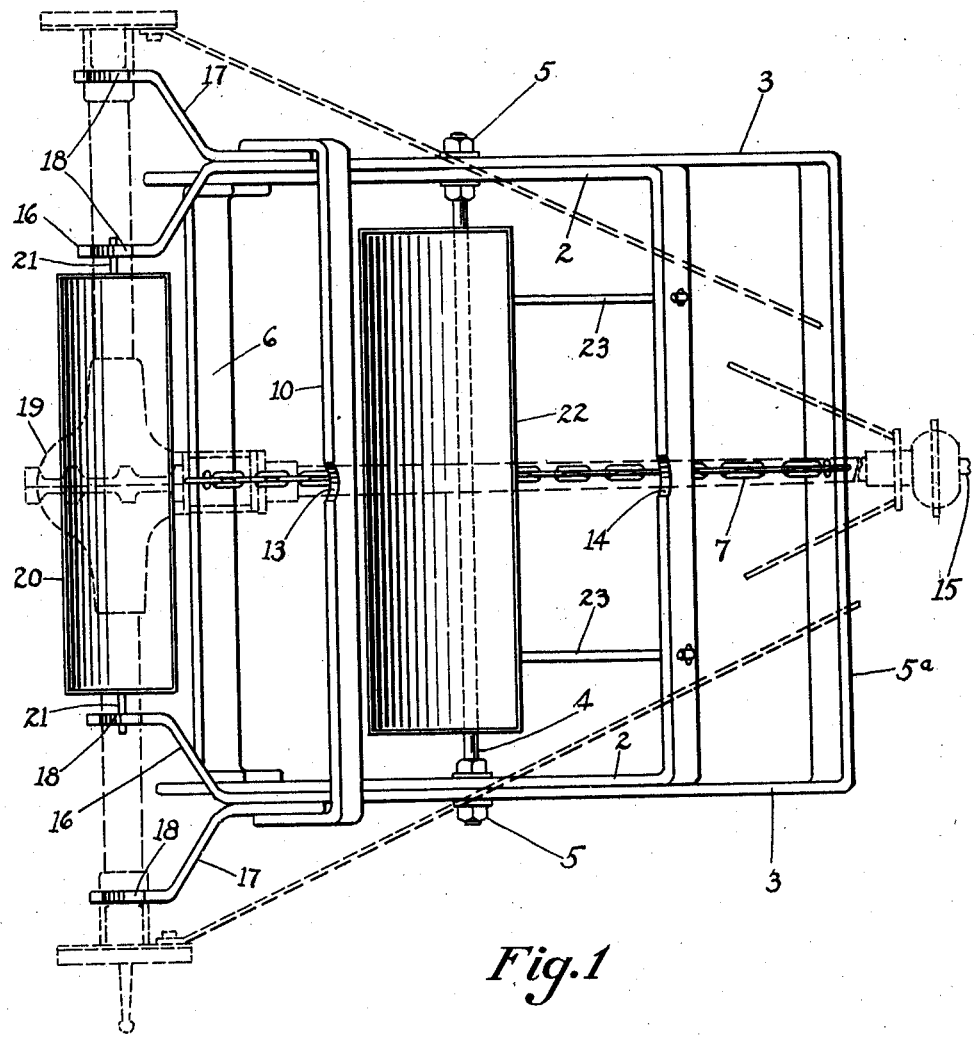
Figure 1 is a plan view of a differential gear rack embodying my invention.
Figure 2:
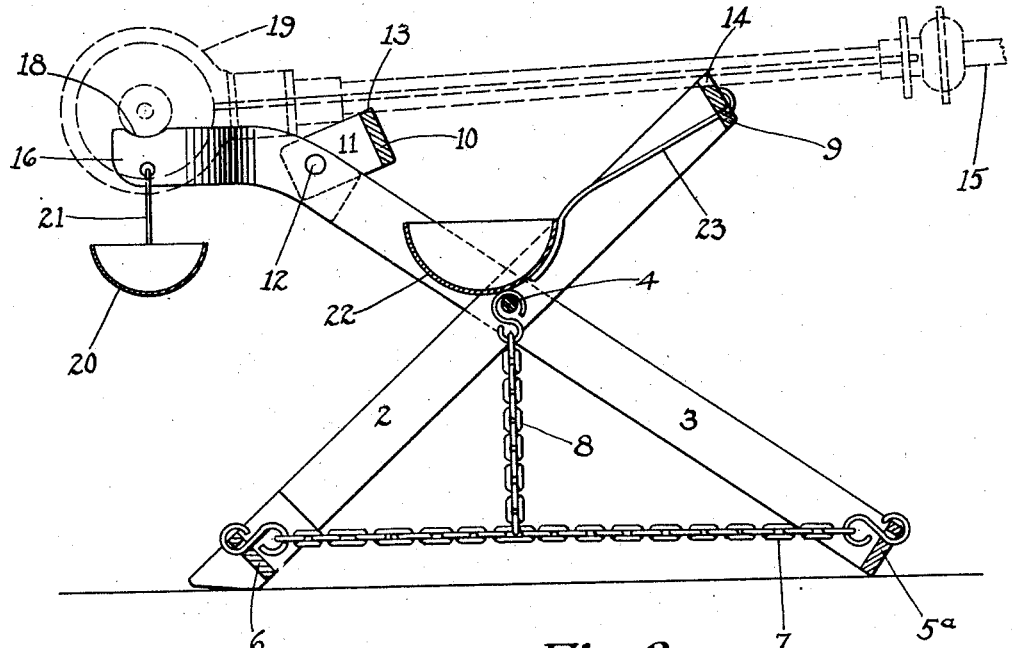
Fig. 2 is a vertical sectional view of the same.

In the drawing, the rack is shown composed of two frames or sections. These frames are preferably made of a flat bar iron and comprise pairs of legs 2 and 3 arranged in crosswise relation, the adjacent legs of the pairs being pivoted one upon the other by means of a rod 4 having nuts 5 for securing the legs thereon, while allowing them to be swung to an open or closed position. The lower ends of the legs have cross bars 5ª and 6 between them and flexible means, such as a chain, is provided for limiting the separation of the lower ends of the legs, and flexible means, such as a chain 8, connects the middle portion of the chains 7 with the rod 4 and coöperates therewith to brace and strengthen the rack. The upper ends of the legs 2 are provided with a cross bar 9, preferably formed by bending the bar of which the legs are composed. The cross bar 10 has end portions 11 bent at right angles to the middle portion and pivoted at 12 to the upper ends of the bars 3 and this cross bar serves to hold the legs in parallel relation and brace and strengthen that portion of the rack. The bar 10 is free to oscillate on its pivots and on one edge is provided with a recess 13 opposite a corresponding recess 14 in the bar 9, said recesses being adapted to receive the housing of a transmission shaft 15 that is seated transversely of the cross bars of the rack.

The upper ends of the legs 3 are provided with forks formed preferably by bending the ends 16 of the legs inwardly and providing opposite thereto bars 17 riveted securely to the upper portions of the legs. These forks have recesses 18 in their upper edges adapted to receive the housing of the differential 19 when the axle is removed from the machine.

Beneath the differential I prefer to provide a pan 20 suspended by hooks 21 and adapted to collect the grease or oil which may drip from the housing of the differential. The pan 22 is supported by straps 23 between the legs of the rack above and near the cross rod 4 and this pan is adapted to contain the tools which the workman will find necessary to use in separating the transmission shaft from the differential housing or reassembling them.

In using this device, the axle and transmission shaft housing are separated from the vehicle and the axle housing seated in the forks of the upper ends of the legs 3, while the transmission shaft housing is carried by the cross bar 10 and the bar 9 at the upper ends of the lugs 2. The workman will then disconnect the transmission shaft from the differential and do whatever work may be needed in the housing of the differential, the axle and shaft in the meantime remaining in the same relative position ready for reassembling and reconnection when the work is completed.

The rack will stand a suitable distance from the floor to enable the workman to conveniently reach all parts of the mechanism without the necessity of stooping to an inconvenient position or working with the differential gearing on the floor of the shop or garage, as usually is the case where no supporting rack is provided. When the work is finished, it is only necessary to move the transmission shaft housing longitudinally to its proper position, connect it up again with the axle, reassemble the parts of the differential housing and return the axle to the vehicle from which it has been taken.

Figure 3:
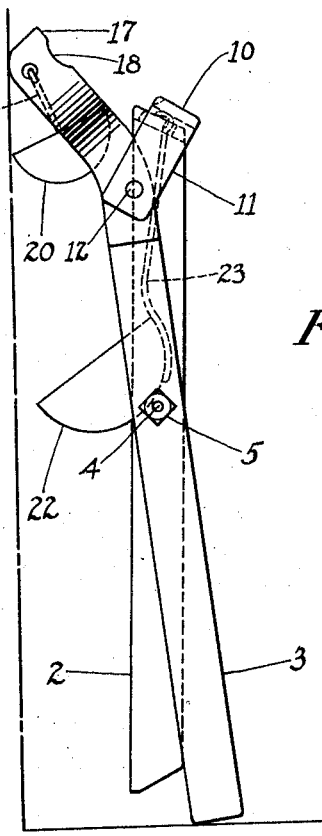
Fig. 3 is an end view of the rack showing it in its folded position.

It is also to be noted that convenient access may be had to the underside of the differential gearing and transmission shaft, which cannot be accomplished conveniently when the mechanism is resting upon a bench or upon the floor. When the apparatus is not in use, the legs may be conveniently folded to the position shown in Fig. 3 and stacked or stored in some place in the shop or garage where it will not interfere with the other work.

I claim as my invention:

1. A differential gear rack comprising two pairs of legs having their middle portions pivoted one upon the other, cross bars connecting the legs of the same pair, the legs of one pair having seats for the axle and the legs of the other pair having a seat for the transmission shaft at right angles to said axle.

2. A differential gear rack comprising two frames having legs pivoted one upon the other, the upper end of one frame having seats for the housing of an axle and differential gear, and the upper end of the other frame having a seat for the housing of a transmission shaft at right angles to the housing of said axle.

3. A differential gear rack comprising frames pivoted one upon the other and having supporting legs and cross bars, the upper end of one frame having forked portions with seats thereon for the housing of an axle and differential and the upper end of the other frame having a cross bar provided with a seat for the housing of the transmission shaft.

4. A differential gear rack comprising frames having legs pivoted one upon the other, the upper end of one frame having seats for an axle housing and differential and a pivoted cross bar near said seats, the other frame having a cross bar parallel with said pivoted cross bar and said cross bars having seats for the housing of a transmission shaft at right angles to the housing of the axle.

In witness whereof, I have hereunto set my hand this 18th day of May, 1920.

CHARLES JOHAN WEST.